(12) United States Patent
Sedjelmaci (10) Patent No.: US 11,936,665 B2
(45) Date of Patent: Mar. 19, 2024

(54) METHOD FOR MONITORING DATA TRANSITING VIA A USER EQUIPMENT

(71) Applicant: Orange, Paris (FR)

(72) Inventor: Hichem Sedjelmaci, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 446 days.

(21) Appl. No.: 17/117,568

(22) Filed: Dec. 10, 2020

(65) Prior Publication Data

US 2021/0185061 A1 Jun. 17, 2021

(30) Foreign Application Priority Data

Dec. 12, 2019 (FR) ...................................... 1914270

(51) Int. Cl.
*H04L 9/40* (2022.01)
(52) U.S. Cl.
CPC ...... *H04L 63/1416* (2013.01); *H04L 63/1425* (2013.01); *H04L 63/1441* (2013.01); *H04L 63/20* (2013.01)
(58) Field of Classification Search
USPC .................................................... 726/22–25
See application file for complete search history.

(56) References Cited

U.S. PATENT DOCUMENTS

| 7,917,955 | B1* | 3/2011 | Spurlock | G06F 21/554 |
| | | | | 713/188 |
| 8,578,494 | B1* | 11/2013 | Engler | G06F 21/552 |
| | | | | 702/179 |
| 9,213,990 | B2* | 12/2015 | Adjaoute | G06Q 20/12 |
| 9,223,972 | B1* | 12/2015 | Vincent | H04L 63/1425 |
| 9,578,048 | B1* | 2/2017 | Hunt | H04L 63/1416 |
| 9,734,337 | B1* | 8/2017 | Patton | G06F 21/568 |
| 9,807,109 | B2* | 10/2017 | Laidlaw | G06F 21/577 |
| 10,032,025 | B1* | 7/2018 | Patton | G06F 21/568 |

(Continued)

FOREIGN PATENT DOCUMENTS

EP 3 226 169 A1 10/2017

OTHER PUBLICATIONS

French Search Report and Written Opinion dated Aug. 11, 2020 for Application No. 1914270.

(Continued)

*Primary Examiner* — Kambiz Zand
*Assistant Examiner* — Mahabub S Ahmed
(74) *Attorney, Agent, or Firm* — Knobbe, Martens, Olson & Bear, LLP (57) ABSTRACT

A method for monitoring data transiting via a user equipment is described, as well as a cyber attack detection device, The method includes obtaining a first decision from a first cyber attack detection technique and a second decision from a second cyber attack detection technique, indicating whether the data are associated with attack traffic, obtaining a third decision from a third cyber attack detection technique indicating whether the data are associated with attack traffic, the third technique the first and second decisions and confidence levels assigned to the first and second detection techniques, updating the confidence levels on the basis of the first, second and third decisions, and adapting, triggered on the basis of the obtained first, second and third decisions and of the updated confidence levels, at least one rule applied by the first and/or the second technique.

15 Claims, 2 Drawing Sheets

(56) References Cited

U.S. PATENT DOCUMENTS

| | | | |
|---|---|---|---|
| 10,050,998 B1* | 8/2018 | Singh | H04L 63/145 |
| 10,055,582 B1* | 8/2018 | Weaver | G06F 21/562 |
| 10,193,918 B1* | 1/2019 | Patton | G06F 21/566 |
| 10,326,777 B2* | 6/2019 | Demopoulos | H04L 63/1475 |
| 10,671,723 B2* | 6/2020 | Krebs | G06F 21/577 |
| 10,891,374 B1* | 1/2021 | Curtin | G06N 20/20 |
| 10,896,256 B1* | 1/2021 | Saxe | G06N 3/04 |
| 11,030,311 B1* | 6/2021 | Lopez | G06N 20/00 |
| 11,361,071 B2* | 6/2022 | Noeth | G06F 21/552 |
| 11,411,977 B2* | 8/2022 | Chiu | G06N 20/00 |
| 2007/0038677 A1* | 2/2007 | Reasor | G06F 21/565 |
| 2007/0156771 A1* | 7/2007 | Hurley | G06F 21/552 |
| 2008/0127336 A1* | 5/2008 | Sun | G06F 21/566 726/22 |
| 2011/0023118 A1* | 1/2011 | Wright | H04L 63/1441 726/23 |
| 2012/0110667 A1* | 5/2012 | Zubrilin | G06F 21/56 726/24 |
| 2013/0042294 A1* | 2/2013 | Colvin | G06F 21/6218 726/1 |
| 2013/0097706 A1* | 4/2013 | Titonis | G06F 21/566 726/22 |
| 2013/0104236 A1* | 4/2013 | Ray | H04L 63/20 726/25 |
| 2013/0145463 A1* | 6/2013 | Ghosh | G06F 21/53 726/22 |
| 2013/0298244 A1* | 11/2013 | Kumar | G06F 21/51 726/25 |
| 2014/0101764 A1* | 4/2014 | Montoro | H04L 67/02 726/23 |
| 2014/0259168 A1* | 9/2014 | McNamee | H04L 63/0218 726/23 |
| 2014/0380488 A1* | 12/2014 | Datta Ray | H04L 63/1408 726/25 |
| 2015/0026809 A1* | 1/2015 | Altman | H04L 63/145 726/23 |
| 2016/0055334 A1* | 2/2016 | Herwono | H04L 63/1458 726/23 |
| 2016/0301716 A1* | 10/2016 | Sadeh-Koniecpol | G06F 21/567 |
| 2016/0330219 A1* | 11/2016 | Hasan | H04L 63/1441 |
| 2016/0359870 A1* | 12/2016 | Gu | G06F 21/564 |
| 2017/0171231 A1* | 6/2017 | Reybok, Jr. | H04L 63/02 |
| 2017/0277887 A1* | 9/2017 | Ijiro | G06F 21/554 |
| 2017/0279818 A1* | 9/2017 | Milazzo | G06F 21/564 |
| 2017/0359306 A1* | 12/2017 | Thomas | H04L 63/145 |
| 2018/0004948 A1* | 1/2018 | Martin | H04L 63/1425 |
| 2018/0307833 A1* | 10/2018 | Noeth | H04L 63/1425 |
| 2018/0367553 A1* | 12/2018 | Hayden | H04L 63/1425 |
| 2019/0026466 A1* | 1/2019 | Krasser | G06N 7/01 |
| 2019/0052662 A1* | 2/2019 | Chiu | H04L 63/20 |
| 2019/0132741 A1* | 5/2019 | Stone | G06F 3/02 |
| 2019/0163900 A1* | 5/2019 | Zhang | G06N 20/00 |
| 2019/0207958 A1* | 7/2019 | Jin | G06V 30/1983 |
| 2019/0311118 A1* | 10/2019 | Grafi | G06F 21/564 |
| 2019/0379677 A1* | 12/2019 | Zenz | G06F 21/554 |
| 2020/0244691 A1* | 7/2020 | Veeramany | H04L 63/0236 |
| 2020/0372154 A1* | 11/2020 | Bacher | H04L 63/1408 |
| 2020/0389469 A1* | 12/2020 | Litichever | H04W 4/40 |
| 2021/0173937 A1* | 6/2021 | Vargas | G06F 21/552 |
| 2021/0200870 A1* | 7/2021 | Yavo | H04L 63/1416 |
| 2022/0092029 A1* | 3/2022 | Kamalapuram | G06F 16/176 |
| 2022/0094710 A1* | 3/2022 | Riahi Manesh | H04L 63/1416 |

OTHER PUBLICATIONS

Abduvaliyev A et al: "Energy efficient hybrid intrusion detection system for wireless sensor networks", Electronics and Information Engineering (ICEIE), 2010 International Conference on, IEEE, Piscataway, NJ, USA, Aug. 1, 2010 (Aug. 1, 2010), pp. V2-25.

* cited by examiner

METHOD FOR MONITORING DATA TRANSITING VIA A USER EQUIPMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority under 35 U.S.C. § 119(a) to French Patent Application No. 1914270, filed Dec. 12, 2019, the disclosure of which is hereby incorporated by reference in its entirety.

BACKGROUND

Technical Field

The disclosed technology relates to the general field of telecommunications, and more particularly to detecting cyber attacks in a communication network.

There is no limit attached to the nature of the network. The disclosed technology is however preferably applicable to mobile networks, and in particular to fifth-generation mobile networks a.k.a 5G mobile networks.

Description of the Related Technology 5G mobile networks, with the sophisticated communication techniques that they use and the new capacities that they offer in terms in particular of data rates, information volumes and connection, are opening up innovative usage perspectives that pose real challenges in terms of cyber security. Over the previous years, numerous intrusion detection techniques (or IDS for intrusion detection systems) and defense techniques have been developed, based on proactive approaches making it possible firstly to anticipate and reduce vulnerabilities in computer systems, and secondly to trigger effective mitigation responses when attacks or intrusions are detected in these computer systems.

Intrusion detection techniques are generally based on two types of approach for detecting cyber attacks:
- signature-based detection: the behavior of the monitored data is compared with that expected in the presence of known attacks. More particularly, each known attack has associated with it a set of values of features representative of the traffic of this attack and that make it possible to distinguish it, these commonly also being called signatures. The same features are extracted from the monitored data and compared with the signatures of the attacks. This approach makes it possible to limit the false positive rate, that is to say the rate of data identified as being associated with attack traffic when they are not. However, this makes it possible to detect only attacks that are already known;
- anomaly detection: this approach is based on constructing, for example by way of a supervised or unsupervised machine learning algorithm, a normal behavioral model of the data, that is to say in the absence of cyber attacks. If the data are not consistent with this model, an anomaly is detected. The advantage of this approach is that it makes it possible to detect new attacks. On the other hand, it has a high false positive rate.

In order to rectify the abovementioned drawbacks, some detection techniques, called hybrid detection techniques, implementing both approaches, have been proposed. Such a hybrid detection technique is described for example in the article by A. Abduvaliyev et al. entitled "Energy Efficient Hybrid Intrusion Detection System for Wireless Sensor Networks", International Conference on Electronics and Information Engineering, 2010.

In the approach adopted in this article, the data packets are first of all inspected by an anomaly detection module. If the anomaly detection module detects an intrusion, the data packets are transmitted to a signature detection module for analysis. The conclusions of the anomaly detection module and of the signature detection module are then provided to a decision module which, on the basis of these conclusions, decides whether or not there is intrusion by applying a set of predefined rules.

This hybrid technique leads to a high detection rate and to high detection accuracy. It is however based on the assumption that the conclusions from the anomaly detection and signature detection modules are reliable. However, these modules may themselves be subjected to a cyber attack.

SUMMARY

The disclosed technology makes it possible in particular to rectify the drawbacks from alternative embodiments by proposing a method for monitoring, by way of a cyber attack detection device, data transiting via a user equipment, this method comprising:
- a step of obtaining at least a first decision provided using a first cyber attack detection technique and a second decision provided using a second cyber attack detection technique, said first and second decisions indicating whether said data are associated with cyber attack traffic;
- a step of obtaining a third decision provided using a third detection technique and indicating whether said data are associated with cyber attack traffic, said third detection technique, in order to provide said third decision, using the first and second decisions and information representative of confidence levels assigned to said first and second detection techniques;
- a step of updating the confidence levels assigned to the first and second detection techniques on the basis of the obtained first, second and third decisions; and
- a step, triggered on the basis of the obtained first, second and third decisions and of the updated confidence levels, of adapting at least one rule applied by said first and/or said second detection techniques for providing the first and second decisions.

In correlation, the disclosed technology also relates to a cyber attack detection device, configured so as to monitor data transiting via a user equipment, this device comprising:
- a first obtainment module, configured so as to obtain at least a first decision provided using a first cyber attack detection technique and a second decision provided using a second cyber attack detection technique, said first and second decisions indicating whether said data are associated with cyber attack traffic;
- a second obtainment module, configured so as to obtain a third decision provided using a third detection technique and indicating whether said data are associated with cyber attack traffic, said third detection technique, in order to provide said third decision, using the first and second decisions and information representative of confidence levels assigned to said first and second detection techniques;

an update module, configured so as to update the confidence levels assigned to the first and second detection techniques on the basis of the obtained first, second and third decisions; and an adaptation module, activated on the basis of the obtained first, second and third decisions and of the updated confidence levels, said module being configured so as to adapt at least one rule applied by said first and/or said second detection techniques for providing the first and second decisions.

Embodiments of the disclosed technology thus propose to combine the decisions provided using a plurality of separate detection techniques (at least two, denoted first and second detection techniques) by taking into account a confidence level assigned to these detection techniques. This confidence level, for example between 0 and 1 or between 0 and 100%, expresses the reliability (or depending on the convention under consideration, the lack of reliability) assigned to each detection technique, and is updated iteratively over the course of the detections performed using the detection technique by comparing these detections with other decisions made using other detection techniques. When a detection technique is assigned a low confidence level (for example, for a confidence level between 0 and 1, a value of lower than or equal to 0.2), this means that it is considered to be unreliable, or even that it is suspected of itself being the target of a cyber attack, such that it is liable to provide intentionally incorrect decisions with regard to the presence or absence of an attack. Faced with such a situation, it may be contemplated to implement specific monitoring of the detection technique, to no longer take its decisions into consideration and/or else to trigger an action for mitigating the attack.

To update the confidence level assigned to each of the first and second detection techniques, embodiments of the disclosed technology advantageously rely on the decision made using another detection technique that is preferably assumed to be trusted (third detection technique), to which the features of the data to be monitored, the decisions made by the first and second (and more where applicable) detection techniques, as well as the current confidence levels assigned to these first and second detection techniques are provided. The decision made using the third detection technique is then compared with the decisions provided using the first and second detection techniques, and the confidence levels are updated on the basis of the result of this comparison.

It will be noted that there is no limit attached to the number of detection techniques under consideration or to the type of detection techniques under consideration. Embodiments of the disclosed technology are not limited to a first, a second and a third detection technique, and may be implemented using decisions provided by a higher number of detection techniques.

However, at least one first detection technique using predefined attack signatures to make its decision and at least one second detection technique using a normal behavioral model of the data will preferably be chosen, such that embodiments of the disclosed technology propose a hybrid detection technique based on the decisions made by various types of detection technique, and thus benefit from the advantages of each of these detection techniques when these are not subjected to an attack (few false positives and a high detection rate). It should furthermore be noted that these two types of technique are complementary in terms of their detection actions (they are able to detect different types of attack). However, this example is not limiting per se, and other configurations may be contemplated in the context of the disclosed technology.

Furthermore, in one particular embodiment, the third detection technique may be selected or protected by an appropriate mechanism so as to make it tamper-proof or at least tamper-resistant to a certain number of attacks. Such a protection mechanism consists for example in implementing the third detection technique from a secure memory space, as described for example in the document by D. Serpanos et al. entitled "Secure Memory for embedded tamper-proof systems", $14^{th}$ International Conference on Design and Technology of Integrated Systems in Nanoscale Era, April 2019.

Embodiments of the disclosed technology furthermore advantageously propose to adjust the rules implemented by the detection techniques under consideration if necessary, on the basis of the decision provided using the third detection technique and the reliability thereof. Such an adjustment may consist in correcting certain rules, in supplementing them (for example via additional features representative of the attack traffic), or else in providing new rules relating to new attacks detected using the third detection technique and hitherto unknown to the first and/or to the second detection techniques.

In one particular embodiment, the third detection technique implements reinforcement learning. Typically, during reinforcement learning, input and/or output parameters of the third detection technique may be adjusted so as to maximize a predefined benefit factor (also called payoff).

This reinforcement is preferably implemented continuously, and makes it possible to make the third detection technique more robust and more effective. It specifically allows dynamic updating of the rules used by the third detection technique, thus reinforcing the accuracy of the detection implemented thereby. Furthermore, by virtue of this continuous reinforcement, the third detection technique is able to adjust and correct an incorrect classification by adapting its input parameters and its decisions with regard to the attacks. It may also adapt to an evolution in the attack time, to the introduction of new attacks, etc.

It will be noted that the reinforcement is made possible not only by virtue of the decisions provided using the first, second and third detection techniques, but it may also result from an external intervention, for example a human intervention (via the provision of elements provided by experts) or an entity of a network to which the user equipment is connected, such as for example a server managing a plurality of user equipments.

As a variant, it is possible to use a third detection technique based on a set of predefined rules.

Such a detection technique has the advantage of being easier to implement.

In one particular embodiment, the monitoring method comprises a step of deactivating the use, by the third detection technique, of the decision provided using the first, respectively using the second, detection technique if the confidence level assigned to the first, respectively to the second, detection technique is lower than a given first threshold.

The first threshold is for example lower than or equal to 0.2. However, this value is given only by way of illustration and does not limit the disclosed technology.

In other words, in this embodiment, the third detection technique does not take into account the decision made using the other detection techniques as soon as these are not sufficiently reliable, and gives the impression that they are deliberately not providing a correct detection, for example because they are the target of an attack.

In one particular embodiment, the step of adapting at least one rule applied by the first, respectively by the second, detection technique is triggered only if the updated confidence level assigned to the first, respectively to the second, detection technique is higher than a given second threshold.

In other words, the rules applied by a detection technique suspected to be the target of an attack are not updated. This results in a reduction in the efficiency of the detection technique, and in correlation of the confidence level that is assigned thereto, since the detections thereof are increasingly less relevant. However, as mentioned above, when the confidence level assigned to a detection technique is lower than a given threshold, the third detection technique may decide to no longer consider the decisions made using this detection technique. The attack detection performed by the detection device is therefore freed from the a priori negative influence of this detection technique that is potentially targeted by an attack and that the third detection technique is not able to trust. The detection technique is therefore forced to provide more reliable decisions, even if it is subjected to an attack, in order to be reintegrated into the data monitoring process.

Various ways of assigning a confidence level to a detection technique may be contemplated.

Thus, for example, the confidence level assigned to the first, respectively to the second, detection technique may be defined as the ratio between:
- a difference between a total number of attacks detected using the first, respectively using the second, detection technique and a total number of false positives and false negatives assigned to the first, respectively to the second, detection technique; and
- a total number of attacks detected using the third detection technique.

In this variant, the decisions made using the third detection technique serve as a reference, and the "bad" decisions made using the first and second detection techniques are counted with respect to this reference in order to estimate the reliability of these first and second detection techniques. As soon as a decision diverges from the one made using the third detection technique, it contributes to lowering its confidence level.

Of course, this definition of the confidence level is given only by way of illustration, and other definitions may be contemplated. For example, the confidence level may be defined by a good reputation level (or by contrast a bad reputation level), corresponding to the number of decisions coinciding with the decisions issued using the third detection technique (by contrast different from the decisions issued using the third detection technique). It is also possible to contemplate weighting the numbers of false positives and false negatives, etc.

It should furthermore be noted that, in order to facilitate the interpretation of this confidence level, it may be constrained to adopting values between 0 and 1 (or between 0 and 100%), by forcing for example values higher than 1 (or higher than 100%) to 1 (or to 100%) and values lower than 0 to 0.

In one particular embodiment, the obtainment, updating and where applicable adaptation steps are implemented within the user equipment, and the method furthermore comprises:
- a step of transmitting, to a server of a network to which said user equipment is connected and configured so as to execute a fourth cyber attack detection technique, features representative of said data to which said fourth detection technique is applied;
- a step of obtaining a fourth decision provided by said server after applying said fourth detection technique, and indicating whether said data are representative of cyber attack traffic;
- the step of updating the confidence levels and, where applicable, the adaptation step also being performed on the basis of the fourth decision.

In this embodiment, a remote server is asked to execute a fourth detection technique on features representative of data in order to determine whether or not these data belong to attack traffic. In other words, the monitoring method is not executed exclusively locally on the user equipment, but is distributed between the user equipment and the server.

Such a server placed in the network conventionally has more hardware and/or software resources (memory, computing resources, power resources, etc.) than the user equipment, and is able to quickly implement more powerful and more robust detection techniques than the user equipment, such as for example machine learning detection techniques, etc. It furthermore also has greater visibility with regard to the traffic exchanged on the network, and in particular with regard to attack traffic. It is advantageously able to use additional information provided by other elements of the network or connected to the network, such as for example other user equipments that it is also managing, or other equipments designed to feed back various alerts or logs to the server. Such a server is for example an MEC (for multi-access edge computing) server of the network, offering computing capacities, memory capacities, etc. at the periphery of the network, close to the user equipment. Latency during exchanges between the user equipment and the server for obtaining the fourth decision is thereby reduced.

The fourth decision provided using the fourth detection technique executed by the server is used to confirm or by contrast overturn the third decision and, where applicable, update the rules used by the first, second and/or third detection techniques in the event for example of detecting an attack hitherto unknown to these three detection techniques. It offers the possibility of reacting more quickly in the presence of an attack. It also makes it possible, in the context in which the third detection technique implements reinforcement learning, to contribute to this reinforcement and thus make the third detection technique more robust and more effective.

In one particular embodiment, the step of transmission to the server is triggered if at least one of the following three conditions is met:
- condition 1: upon detection of abnormal behavior of the user equipment using the third detection technique;
- condition 2: if the confidence levels assigned to the first and second detection techniques are both lower than a given third threshold, for example lower than 0.6; or
- condition 3: if a time for the user equipment to obtain the fourth decision provided by the server is less than a time for the user equipment to obtain the third decision by executing the third detection technique itself.

Condition 1, triggering transferral of the detection of an attack to the server, in particular offers the possibility of detecting new attacks, unknown for example to the first, second and third detection techniques.

Condition 2 allows the third detection technique to use another detection technique when the decisions from the first and second techniques are not considered to be sufficiently reliable. If the fourth decision contradicts those provided using the first and second detection techniques, and in particular if the server detects an attack whereas the other two techniques have not detected one, the server may send a message to the user equipment prompting it to no longer take into account the decisions provided using these two detection techniques in its monitoring of the traffic exchanged on the network. The progression of the attack is thus stopped at the traffic monitoring level. If by contrast the fourth decision is consistent with the first and second decisions, the server may transmit new rules to be applied to the third detection technique in order to reinforce its learning.

Condition 3 makes it possible to improve the speed of execution of the attack detection.

In particular, in one particular embodiment, when the step of transmission to the server is triggered because condition 3 is met, the user equipment abstains from executing the third detection technique, and the fourth decision is used to determine whether an attack is targeting the user equipment and, if so, for the adaptation step as a substitute for the third decision.

As mentioned above, in some embodiments, the monitoring method may be executed locally in the user equipment.

Embodiments of the disclosed technology also relate to a user equipment comprising a detection device.

However, the monitoring method may also be distributed between the user equipment and a remote equipment, such as for example a server of a telecommunications network to which the user equipment is in particular connected.

Embodiments of the disclosed technology therefore more generally relate to a communication system comprising:
 a user equipment;
 a detection device, configured so as to monitor data transiting via said user equipment, and execute a first, a second and a third cyber attack detection technique; and
 a server of a network to which said user equipment is connected, configured so as to execute a fourth cyber attack detection technique.

The modules of the detection device may be integrated into the user equipment or be distributed between the user equipment and the server.

The user equipment and the communication system benefit from the same advantages as the monitoring method and the detection device.

In one particular embodiment of the disclosed technology, the monitoring method is implemented by a computer.

Embodiments of the disclosed technology also relate to a computer program on a recording medium, this program being able to be implemented in a computer or more generally in a detection device, and comprising instructions designed to implement a monitoring method as described above.

This program may use any program language, and be in the form of source code, object code or intermediate code between source code and object code, such as in a partially compiled form, or in any other desirable form.

Embodiments of the disclosed technology also relate to a computer-readable information medium or recording medium comprising instructions of the abovementioned computer program.

The information medium or recording medium may be any entity or device capable of storing the programs. For example, the medium may comprise a storage means, such as a ROM, for example a CD-ROM or a microelectronic circuit ROM, or else a magnetic recording means, for example a hard disk or a flash memory.

On the other hand, the information medium or recording medium may be a transmissible medium, such as an electrical or optical signal, which may be routed via an electrical or optical cable, via radio link, via wireless optical link or by other means.

The program may in particular be downloaded from an Internet network.

As an alternative, the information medium or recording medium may be an integrated circuit in which a program is incorporated, the circuit being designed to execute or to be used in the execution of the communication method, or the selection method It is also possible to contemplate, in other embodiments, the monitoring method, the detection device, the user equipment and the communication system having all or some of the abovementioned features in combination.

BRIEF DESCRIPTION OF THE DRAWINGS

Other features and advantages of the disclosed technology will become apparent from the description given below, with reference to the appended drawings, which illustrate one exemplary embodiment thereof, without any limitation. In the figures.

DETAILED DESCRIPTION

Figure 1:
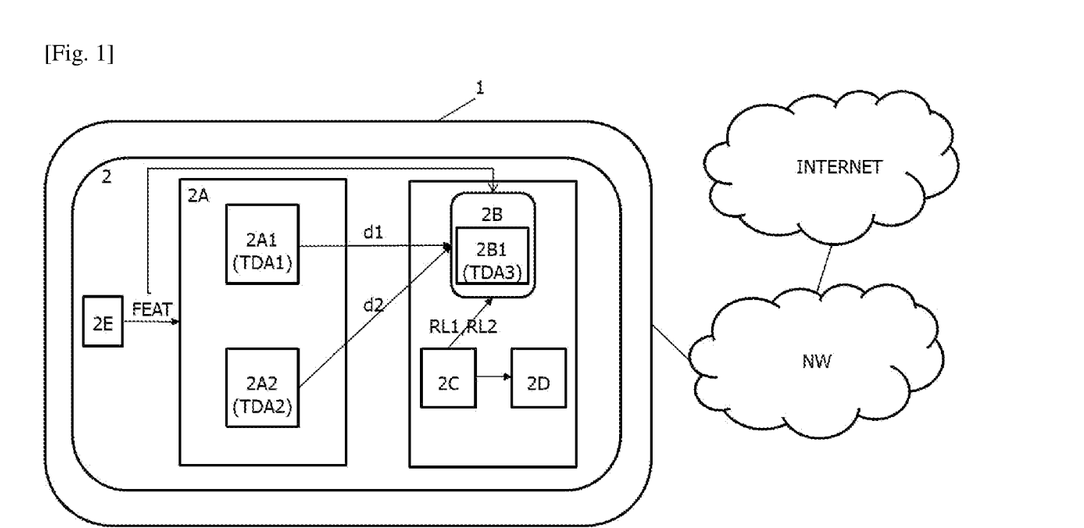
FIG. 1 shows, in its environment, a user equipment in one particular embodiment.

FIG. 1 illustrates, in its environment, a user equipment 1 connected to a communication network NW, in one particular embodiment.

In the example contemplated in FIG. 1, the network NW is a 5G (5$^{th}$ Generation) communication network comprising a core network CN to which the user equipment is able to connect via an access network, such as for example a mobile access network. These scenarios are however not limiting, and the disclosed technology also applies to other types of network, such as for example to 2G, 3G or else 4G networks, to Wi-Fi (Wireless Fidelity) networks, etc.

5G networks such as the network NW offer a wide variety of user equipments (referenced generally here by UE) the possibility of benefitting from connectivity (i.e. to be "connected") and to access in particular the public Internet network. There is no limit attached to the nature of the user equipment 1. It may be a vehicle (for example a land vehicle or air vehicle), an IoT (Internet of Things) object, such as a sensor, a watch, etc., a smart terminal such as a smartphone, a digital tablet, a laptop computer, etc.

In the embodiment described here, in order to protect the user equipment 1 from various cyber attacks that may in particular stem from the public Internet network, the user equipment 1 comprises an attack detection device 2. The detection device 2 is configured so as to implement a monitoring method, by way of various software and/or hardware modules defining various functional modules, and in particular:
 a first obtainment module 2A, in this case comprising a
  first submodule 2A1 configured so as to implement a first cyber attack detection technique TDA1, and a second submodule 2A2, configured so as to implement a second cyber attack detection technique TDA2. The first obtainment module 2A is configured so as to obtain a first decision provided by the first submodule 2A1 and a second decision provided by the second submodule 2A2, these first and second decisions indicating whether the data transiting via the user equipment 1 and intended for or originating from the network NW are associated with cyber attack traffic;

a second obtainment module 2B comprising a submodule 2B1 for implementing a third cyber attack detection technique TDA3. The second obtainment module 2B is configured so as to obtain a third decision provided by the submodule 2B1 and indicating whether the data transiting via the user equipment 1 and intended for or originating from the network NW are associated with cyber attack traffic are associated with cyber attack traffic. According to embodiments of the disclosed technology, the submodule 2B1, to make its decision, uses the first and second decisions provided by the submodules 2A1 and 2A2, and information representative of confidence levels assigned to said first and second detection techniques (that is to say equivalently to the first and second submodules 2A1 and 2A2);

an update module 2C, configured so as to update the confidence levels assigned to the detection techniques TDA1 and TDA2 on the basis of the first, second and third decisions; and an adaptation module 2D, activated on the basis of the first, second and third decisions and of the updated confidence levels, this adaptation module being configured so as to adapt at least one rule applied by said first and/or said second detection techniques for providing the first and second decisions.

In the embodiment described here, the detection device 2 also comprises an aggregation module 2E, configured so as to aggregate various features representative of the data traffic transiting via the user equipment 1, and intended to be used by the detection techniques TDA1, TDA2 and TDA3 to determine whether the user equipment 1 is the target of a cyber attack, in other words whether the data traffic transiting via the user equipment 1 exhibits the features of traffic affected by a cyber attack.

Figure 2:
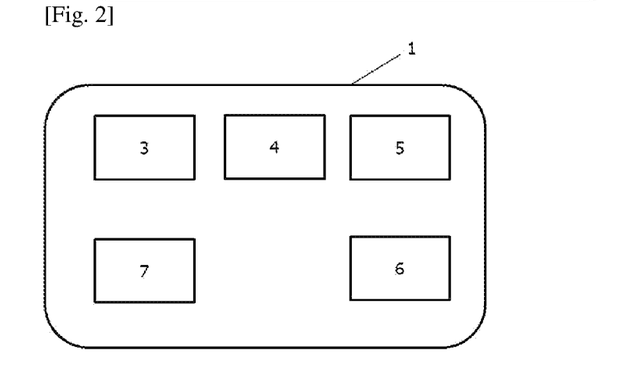
FIG. 2 shows the hardware architecture of the user equipment of FIG. 1, in one particular embodiment.

The abovementioned software components may be integrated into a computer program. The user equipment 1 may for example have the hardware architecture of a computer as shown in FIG. 2, and comprise in particular a processor 3, a random access memory 4, a read-only memory 5, a non-volatile flash memory 6, and communication means 7 comprising one or more communication interfaces. In the embodiment described here, the read-only memory 5 of the user equipment 1 is a recording medium, able to be read by the processor 3 and on which there is recorded a computer program PROG, which comprises instructions for implementing a monitoring method according to embodiments of the disclosed technology and the definition of the modules 2A to 2D.

The functions of the modules 2A and 2D are described in more detail below with reference to FIG. 3.

It will be noted that, in the example contemplated in FIG. 1, the first obtainment module 2A comprises two submodules implementing two different cyber attack detection techniques TDA1 and TDA2. It is assumed here for example that the detection technique TDA1 uses predefined attack signatures, whereas the detection technique TDA2 uses a normal behavioral model of the data, established by way of machine learning, in order to determine whether or not the data transiting via the user equipment 1 exhibit an anomaly. Such detection techniques are not further described in detail here.

As a variant, it is possible to contemplate other cyber attack detection techniques. It is furthermore also possible to contemplate a higher number of submodules each implementing a different detection technique, for example a plurality of detection techniques based on predefined signatures, or a plurality of detection techniques based on various machine learning algorithms, etc.

Moreover, in the example contemplated here, the third detection technique TDA3 is an unsupervised reinforced machine learning technique. This technique TDA3 uses for example a deep neural network, a support vector machine (SVM), a generative adversary network (GAN), a K-means algorithm, etc. It is assumed here that the technique TDA3 has been "initialized" with various information provided by experts, in a manner not further described here. These scenarios are not limiting per se, and it is possible, as a variant, to use other detection techniques, such as for example a supervised or semi-supervised machine learning technique, or else a detection technique based on predefined rules, etc.

It should be noted that the decisions provided using the detection techniques that are used indicate whether or not the data traffic whose features they have analyzed is representative of attack traffic, taking into account the rules that they apply to identify such traffic. They may however take different forms and comprise different information, such as characterizing the detected attack where applicable, mitigation techniques to be applied in response to the detected attack where applicable, etc.

Figure 3:
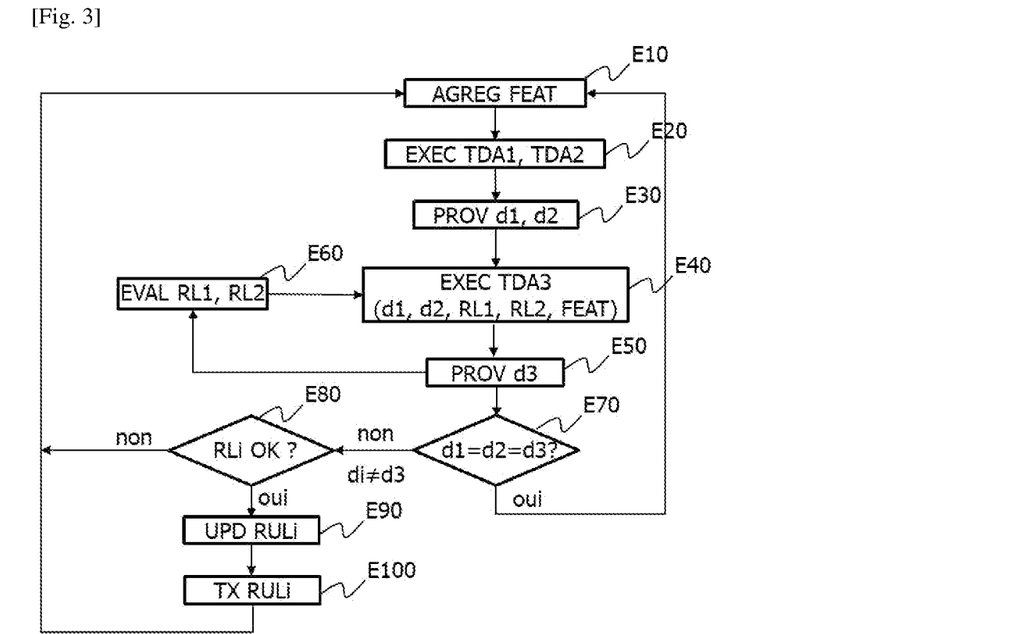
FIG. 3 shows certain steps of a monitoring method, in one particular embodiment in which it is implemented by a detection device, integrated into the user equipment of FIG. 1.

FIG. 3 shows the main steps of a monitoring method in one particular embodiment in which these steps are implemented by the modules 2A to 2E of the detection device 2 integrated into the user equipment 1. In other words, in this embodiment, the steps of the monitoring method are implemented locally within the user equipment 1.

As mentioned above, the user equipment 1 is connected to the communication network NW via which it has connectivity and in particular access to the Internet. By virtue of this access, it is vulnerable to cyber attacks, and in particular to cyber attacks propagated via the Internet. Such attacks are routed to the user equipment 1 via data that are intended therefor and may be propagated by the user equipment 1 via the data that it transmits. The detection device 2 is therefore configured so as to monitor the data transiting via the user equipment 1.

To this end, the aggregation module 2E of the detection device 2 aggregates various features of the data traffic transiting via the user equipment 1 at a given time or over a given time period, evaluated or measured by elements of the user equipment 1, or by elements external to the user equipment 1 (such as for example by equipments of the network NW or by neighbour nodes of the user equipment 1) (step E10). These features of traffic, denoted FEAT here, are evaluated or measured at a determined frequency on the data transiting via the user equipment 1: this may be for example a number of lost packets, a quality of the signal received by the user equipment 1, a communication time, a number of connections of the user equipment 1 that have failed, a number of "non-useful" packets transmitted by or transiting via the user equipment 1, a number of erroneous connections to a site, etc. They correspond to the features examined by the detection techniques implemented in the detection device 2 in order to determine whether the user equipment 1 is behaving normally or whether it is the victim of a cyber attack. They of course depend on the detection techniques implemented by the submodules 2A1 and 2A2, but also by the submodule 2B1. The way in which these features are acquired is not further described in detail here.

The features FEAT of the data traffic transiting via the user equipment 1 and aggregated by the module 2E of the detection device 2 are provided thereby to the first obtainment module 2A, and more particularly to the submodules 2A1 and 2A2 respectively implementing the detection techniques TDA1 and TDA2.

The submodules 2A1 and 2A2 then respectively apply the detection techniques TDA1 and TDA2 to the features FEAT received from the aggregation module 2E (step E20). It will be noted that the submodules 2A1 and 2A2 do not necessarily consider the same traffic features at input in order to determine whether or not said traffic is abnormal and linked to a cyber attack. For the sake of simplification here, reference is made here to the features FEAT in a general manner, with the knowledge that these may be selected on the basis of the configuration of the detection techniques. It will furthermore be noted that the detection techniques TDA1 and TDA2 may be executed in parallel or in sequence.

Each detection technique TDA1, TDA2 provides a decision, respectively denoted d1 and d2, indicating whether or not the data transiting via the user equipment 1 are representative of attack traffic (step E30). These decisions are transmitted to the second obtainment module 2B of the detection device 2.

According to embodiments of the disclosed technology, the obtainment module 2B, and more particularly the submodule 2B1, takes, as inputs for the detection technique TDA3, in addition to the decisions dl and d2 provided using the detection techniques TDA1 and TDA2, confidence levels, denoted RL1 and RL2 here, assigned respectively to each of the detection techniques TDA1 and TDA2 by the update module 2C.

In the embodiment described here, these confidence levels are between 0 and 1 and initialized at 1. In the convention adopted here, a confidence level close to 0 denotes an unreliable detection technique, liable to be the target of a cyber attack. By contrast, a confidence level close to 1 denotes a detection technique that is considered to be reliable.

Of course, these scenarios are not limiting per se; other conventions may be contemplated (for example the opposite convention, or a confidence level between 0 and 100%, etc.).

More precisely, the confidence levels RL1 and RL2 are used by the detection device 2 to estimate the reliability of the decisions issued using the detection techniques TDA1 and TDA2. In the embodiment described here, the following rules are applied by the detection device 2:
  if the confidence level RL assigned to a detection technique TDA is between 0.6 and 1, the detection technique TDA and, in correlation, the decision that it provides, are considered to be reliable and trusted;
  if the confidence level RL assigned to a detection technique TDA is between 0.2 and 0.6, the detection technique TDA and, in correlation, the decision that it provides, are considered to be doubtful or suspect; and
  if the confidence level RL assigned to a detection technique TDA is between 0 and 0.2, the detection technique TDA and, in correlation, the decision that it provides, are considered to be malicious, that is to say affected by a cyber attack.

Of course, these values are given only by way of illustration, and other values may be contemplated depending on the detection techniques under consideration. These values may be adjusted experimentally or by experts. It will moreover be noted that these values may evolve over time.

The confidence levels RL1 and RL2 assigned to the detection techniques TDA1 and TDA2 are updated by the update module 2C over the course of the detections performed by the submodules 2A1 and 2A2, in other words they are re-evaluated upon each decision provided by the modules 2A1 and 2A2, as described in more detail below with reference to step E60.

As mentioned above, the current confidence levels RL1 and RL2 (in other words, those associated with the decisions d1 and d2 currently being analyzed, before being updated) are provided, with the decisions d1 and d2, to the second obtainment module 2B, and more particularly to the submodule 2B1, as inputs for the detection technique TDA3. The submodule 2B1 is also provided with the features FEAT of the data traffic aggregated by the aggregation module 2E and used by the detection technique TDA3. It will however be noted that, in the embodiment described here, if the confidence level RL assigned to one of the detection techniques is lower than a certain threshold (also referred to herein as a first threshold in certain embodiments), equal to 0.2 here (in other words the threshold below which a detection technique is considered to be malicious), the submodule 2B1 deactivates the use, by the detection technique TDA3, of the decision provided using this detection technique. This thus avoids taking into account the decision from a detection technique that is considered to be malicious.

In the embodiment described here, the detection technique TDA3 implements an unsupervised reinforced machine learning algorithm to predict and detect attacks. The technique TDA3 in this case classifies elements that are provided thereto at input, using for example a deep neural network, known per se, initialized from information provided by an expert (features of the traffic and associated decisions). The learning and the detection are performed continuously (that is to say iteratively) for each decision provided using the detection techniques TDA1 and TDA2, and so as to optimize a given benefit factor (or payoff). In other words, if the technique TDA3 is modeled by a set of parameters $\{D,F,P(D,F)\}$, D denoting the decisions liable to be taken using the technique TDA3 (that is to say the output parameters of the technique TDA3), F denoting the parameters that are provided thereto at input and P(D,F) denoting the function defining the benefit factor that it is sought to optimize, upon each iteration (i.e. execution) of the technique TDA3, the classification that is performed is updated so as to optimize the benefit factor P(D,F) over a predetermined time window.

In this modeling, the input parameters F comprise the decisions provided using the detection techniques TDA1 and TDA2 and the features FEAT considered by the detection technique TDA3. It is furthermore possible to consider other input parameters, such as for example parameters reflecting a security context, such as the nature of the attacks detected using the detection techniques TDA1 and TDA2. It will be noted that, given their specific natures, the detection techniques TDA1 and TDA2 do not necessarily detect attacks of the same type. It is also possible to include, in the input parameters, other parameters such as the detection times of the attacks, in order to keep a log of the detected attacks.

The output parameters D in this case comprise two decision types: decisions relating to the presence or absence of attacks in the traffic characterized by the features FEAT, and decisions relating to the reliability of the detection techniques TDA1 and TDA2 (for example, whether they are reliable, doubtful or malicious techniques).

In the embodiment described here, upon each iteration (denoted i hereinafter), the detection technique TDA3 checks whether the output parameters D (decisions) have evolved, taking into account the input parameters F that are provided thereto. If the decisions have remained unchanged, the benefit factor is increased here for the iteration i under consideration using the following relationship: $P_i(D,F)=[P_{i-1}(D,F)+1]/N(TDA3)$, where N(TDA3) denotes the total number of attacks detected using the third detection technique TDA3. If not, the benefit factor for the iteration i under consideration is decreased using the relationship: $P_i(D,F)=[P_{o-1}(D,F)-1]/N(TDA3)$. The learning is performed continuously (i.e. upon each iteration); it may be suspended after a certain number of iterations x, provided that all of the parameters (D,F) remain unchanged over these x successive iterations or over a given time period.

After a predefined time period, denoted T here, T corresponding to the execution of a number Niter of iterations (Niter denoting an integer chosen to be greater than 1, for example Niter equal to 100 or 150), the value of the benefit factor for the following time period is estimated here using the following relationship (kT being used to index the current time period and (k+1)T the following period, k denoting an integer greater than or equal to 0, and $P_{Niter}(D,F)_{kT}$ denoting the value of the benefit factor obtained at the end of the time period indexed by kT, in other words at the iteration Niter executed over this period):

$$P(D,F)_{(k+1)T} = P_{Niter}(D,F)_{kT} + \alpha(\beta P_{Niter}(D,F)_{kT} - P_{Niter-1}(D,F)_{kT})$$

where α and β denote real numbers between 0 and 1 (α, β≠1) corresponding respectively to the learning rate and to the update factor of the learning algorithm implemented by the detection technique TDA3. It will be noted that the payoff factor may be initialized at an arbitrary value, for example 0.5, or if the environment in which the user equipment UE is located is unsecured, it may be contemplated to initialize it at 0.

The value of the benefit factor thus predicted $P(D,F)_{(k+1)T}$ is used to determine the accuracy of the detection technique TDA3 with respect to an expected or desired accuracy (for example a benefit factor equal to 1). If after x iterations this value no longer evolves, this means that the detection technique TDA3 has reached its maximum accuracy. If this does not correspond to the expected accuracy, an external intervention may be triggered in order to reinforce the learning (for example a human intervention by an expert or the intervention of another machine learning detection technique, etc.).

At each iteration, in parallel with the reinforcement learning that is performed, the detection technique TDA3 provides a decision d3 indicating whether or not the data represented by the features FEAT that it has considered are associated with cyber attack traffic (step E50).

This decision d3 is used to verify the reliability of the decisions from the detection techniques TDA1 and TDA2, and if necessary reinforce the efficiency of these two detection techniques if they are considered to be reliable, by updating the rules that they use.

More specifically, first of all, the confidence levels assigned to the detection techniques TDA1 and TDA2 are updated using the decision d3 and the decisions d1 and d2 (step E60).

In the embodiment described here, the confidence level RL (RL=RL1 or RL2) assigned to a detection technique TDA (TDA=TDA1 or TDA2) is defined as the ratio between:

the difference between the total number of attacks, denoted N(TDA), detected using the detection technique and the total number F(TDA) of false positives and false negatives assigned to this detection technique; and the total number of attacks N(TDA3) detected using the third detection technique TDA3 from the same data traffic;

that is to say:

$$RL=[N(TDA)-F(TDA)]/N(TDA3)$$

The evaluation of the confidence levels is therefore based on the comparison of the decisions d1 and d2 provided using the detection techniques TDA1 and TDA2 with the decision d3 provided using the detection technique TDA3, these three decisions having been formulated based on the features FEAT of the traffic transiting via the user equipment 1 at a given time or over a given time period.

More particularly, it will be noted that, in the above relationship, the ratio N(TDA)/N(TDA3) expresses as it were the "good" reputation that is allocated to the detection technique TDA: the detection technique TDA is more reliable when it provides decisions with regard to the traffic (representing or not representing an attack) similar to those provided using the detection technique TDA3 that is considered to be a reference.

By contrast, the ratio F(TDA)/N(TDA3) reflects the "bad" reputation that is allocated to the detection technique TDA: this bad reputation originates from the incorrect detections achieved using the detection technique TDA, in other words, all the false positives and the false negatives. The number of false or incorrect detections performed using the detection technique TDA is estimated here with respect to the decisions provided using the reference detection technique TDA3 and using the other detection techniques implemented by the detection device 2 and different from the detection technique TDA, for example by applying a majority voting mechanism. Thus, by way of illustration, if the majority of the detection techniques have detected an attack (respectively have not detected an attack) whereas the detection technique TDA has not detected one (respectively whereas the detection technique TDA has detected one), it is considered that the detection technique TDA has made a bad decision (i.e. a false negative, respectively a false positive, is associated therewith). As a variant, it is possible to estimate the false detections made by each of the detection techniques TDA1 and TDA2 differently (for example taking into account only the decision d3 from the detection technique TDA3).

As mentioned above, a confidence level of between 0 and 1 is contemplated here, meaning that if, by applying the definition given above, the update module 2C obtains a confidence level lower than 0, it forces the confidence level to the value 0; similarly, if a confidence level higher than 1 is obtained, this is forced to the value 1.

The confidence level may for example be defined by a good reputation level (or by contrast bad reputation level), corresponding to the numbers of decisions coinciding with the decisions issued using the third detection technique (by contrast different from the decisions issued using the third detection technique).

The updated confidence levels RL1 and RL2 as well as the decisions d1, d2 and d3 are provided to the adaptation module 2D.

This compares the decisions d1 and d2 with the decision d3.

If the three decisions are identical or at least all three of them indicate that the data transiting via the user equipment 1 are representative of attack traffic (response yes to test step E70), the adaptation module 2D does not activate adaptation (that is to say updating) of the rules here (return to step E10, and a new "iteration" of the monitoring method is triggered).

If at least one of the decisions d1 and/or d2 is different from the decision d3 or at least if at least one of the decisions d1 and/or d2 indicates the presence of an attack whereas d3 indicates the opposite, or if at least one of the decisions d1 and/or d2 indicates the absence of an attack whereas d3 has detected one, the adaptation module 2D examines the updated confidence level assigned to the detection technique that issued an incorrect decision with respect to d3 (test step E80). di will be used hereinafter to denote the incorrect decision, and TDAi will be used to denote the detection technique at the origin of this incorrect decision, i being able to be equal, in the example contemplated here, to 1 or 2.

If the updated confidence level RLi assigned to the detection technique TDAi reveals a reliable detection technique (response yes to test step E80), in other words in the example contemplated here is higher than 0.6 (also referred to herein as a second threshold in certain embodiments), the adaptation module 2D triggers the adaptation of the rules used by the detection technique TDAi based on the rules applied for the detection using the detection technique TDA3 or provided using a more effective machine learning technique, situated for example on a remote machine separate from the user equipment 1 (in a server of the network for example), or determined via a human intervention by experts (step E90). The adaptation of the rules of the detection technique TDAi may comprise for example providing new features to be considered for the detection, new signatures (for example if an attack unknown to the detection technique TDAi has been detected using the detection technique TDA3), etc. The rules thus adapted (denoted RULi in FIG. 3) are then transmitted, by the adaptation module 2D, to the module implementing the detection technique TDAi (step E100).

The detection technique TDAi then uses these adapted rules during its next execution (return to step E 10 and a new "iteration" of the monitoring method is triggered).

If the updated confidence level RLi assigned to the detection technique TDAi reveals a doubtful or malicious detection technique (response no to test step E80), in other words in the example contemplated here is lower than 0.6 (also referred to as a second threshold), the adaptation module 2D does not adapt the rules used by the detection technique TDAi (return to step E10 and a new "iteration" of the monitoring method is triggered). By acting in this way, the disclosed technology makes use of the fact that, since the detection technique TDAi is not updated, it will continue to provide incorrect decisions, and see its confidence level reduced over the course of the detections so as to be automatically "ejected" from the monitoring process as soon as this confidence level is lower than 0.2 (also referred to as a first threshold). In other words, the faulty decision technique has to correct its decisions if it wishes to continue participating in the monitoring of the data transiting via the user equipment 1.

Figure 4:
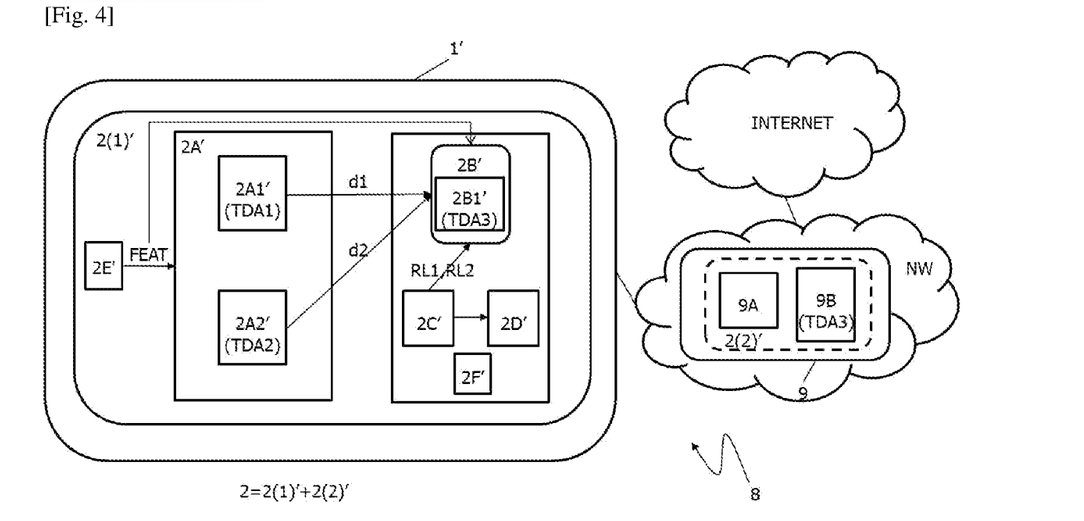
FIG. 4 shows, in its environment, a communication system in one particular embodiment.

In the embodiment that has just been described, all of the steps of the monitoring method are implemented locally in the user equipment 1. In another embodiment, it may be contemplated for the monitoring method to use a remote equipment to implement some steps, for example a server of the network NW to which the user equipment 1 is connected, such as an MEC server located close to the user equipment 1. In other words, in this embodiment, the detection device comprises modules distributed over the user equipment and over the server. The user equipment, the detection device and the server form a communication system. FIG. 4 illustrates such a communication system: in FIG. 4, the communication system is referenced by 8, the user equipment is referenced by 1', the detection device is referenced by 2' and the server is referenced by 9. It will be noted that the server 9 preferably manages a plurality of user equipments implementing the disclosed technology in the same way as the user equipment 1' (not shown in FIG. 4 for the sake of simplicity).

In the embodiment shown in FIG. 4, the part 2'(1) of the detection device 2' integrated into the user equipment 1' comprises modules 2A' (and submodules 2A1' and 2A2'), 2B' (and a submodule 2B 1'), 2C', 2D' and 2E' similar or identical to the modules 2A, 2B, 2C, 2D and 2E of the user equipment 1 that are described above. It furthermore comprises an exchange module 2F' configured so as to exchange information with the server 9. This exchange module 2F' may in particular rely on the communication module 7 of the user equipment 1.

In the embodiment shown in FIG. 4, the server 9 comprises an exchange module 9A configured so as to exchange information with the user equipment 1 (and with other user equipments), and a module 9B configured so as to execute a fourth detection technique, denoted TDA4, different from the detection techniques TDA1, TDA2 and TDA3. Since the server 9 is located in the network, it is more easily able to have more hardware and software resources than the user equipment 1'. The fourth detection technique TDA4 may therefore advantageously be more robust and more accurate than the detection techniques TDA1, TDA2 and TDA3 housed in the user equipment 1'. For example, the detection technique TDA4 is a machine learning algorithm. The modules 9A and 9B belong to a part 2' (2) of the detection device 2' that is remote on the server 9. Furthermore, since the server 9 is connected to a plurality of user equipments similar to the user equipment 1', it may benefit from information from these user equipments regarding the security context in which the user equipment 1' is located (collaborative monitoring mode).

The steps of the monitoring method that are implemented by the detection device 2' are identical or similar to the steps described above with reference to FIG. 3. However, in order to exploit the properties of the fourth detection technique TDA4 implemented by the server 9, the exchange module 2F' transmits, to the module 9A of the server 9, the aggregated features FEAT of the data transiting via the user equipment 1' (at least those used by the detection technique TDA4). The module 9B triggers the execution of the fourth detection technique TDA4. It will be noted that, during the execution of the fourth detection technique TDA4, the module 9B may consider other features of the traffic transiting via the user equipment 1', acquired by virtue of its "central" position in the network NW and its greater visibility with regard to the data exchanged in the network NW and at the user equipments connected thereto.

This results in a fourth decision, denoted d4, provided using the detection technique TDA4, indicating whether or not the data corresponding to the features FEAT that have been provided thereto are representative of attack traffic.

The fourth decision d4 is transmitted, via the exchange module 9A, to the user equipment 1' and more particularly to the update modules 2C' and to the adaptation module 2D' of the detection device 2'. The fourth decision d4 may be accompanied by new detection rules intended for the detection techniques TDA1, TDA2 and/or TDA3. Since the server 9 has more information than the detection techniques TDA1, TDA2 and TDA3 and implements a more accurate and more robust detection technique, it may be able to detect abnormal behavior of the data transiting via the user equipment 1 and/or attacks hitherto unknown to the detection techniques TDA1, TDA2 and/or TDA3.

Step E70 of updating the confidence levels of the monitoring method then takes into account the fourth decision d4, in the same way as the third decision d3, in order to update the confidence levels.

Likewise, step E100 of adapting the rules applied by the detection technique TDAi that provided an incorrect decision takes into account the fourth decision, in the same way as the third decision, and where applicable new detection rules transmitted by the server 9.

In one particular embodiment, the request to the server 9 to execute the fourth detection technique TDA4, and the transmission of the features FEAT to the server 9 for this purpose, may be triggered upon the user equipment 1' detecting a determined event. Such an event is for example the detection that one of the following conditions is met:

condition 1: abnormal behavior of the user equipment 1 using the third detection technique TDA3 based on the features FEAT. For example, the decision d3 provided using the third detection technique TDA3 indicates that the user equipment 1 is affected by an attack or that one of the detection techniques TDA1 or TDA2 is malicious or suspect;

condition 2: confidence levels RL1 and RL2 assigned to the first and second detection techniques TDA1 and TDA2 both lower than a given threshold (also referred to as a third threshold in certain embodiments). This threshold is taken for example to be equal to 0.6, in other words condition 2 is equivalent to checking whether the two detection techniques are suspect or malicious;

condition 3: time for the user equipment 1' to obtain the fourth decision d4 provided by the server 9 (which comprises the transmission time of the features FEAT to the server 9, the execution time of the detection technique TDA4 and the time to transmit the decision d4 to the user equipment 1') less than a time for the user equipment 1' to obtain the third decision d3 by executing the third detection technique TDA3 itself. The time to obtain the decision d4 may vary depending on the number of features FEAT transmitted to the server 9. To estimate this time to obtain the decision d4, the user equipment 1' may use information representative of the hardware and software resources of the server 9 (in particular relating to the detection technique TDA4 executed by the server 9) with which it was configured beforehand. This information allows it to determine, from these features that it sends to the server 9, the time that it will need to execute the detection technique TDA4 and provide a decision d4, as well as the times to transmit the features from the user equipment 1' to the server 9 and the decision d4 from the server 9 to the user equipment 1'.

It will be noted that, when it is condition 2 that triggers the request to the server 9, the exchange module 2F' of the user equipment 1' also transmits, to the exchange module 9A of the server 9, in addition to the features FEAT, its own decision d3, as well as the confidence levels assigned to the detection techniques TDA1 and TDA2, in order for the server 9 to confirm that the detection techniques TDA1 and TDA2 are suspect or malicious. When the server 9 confirms this classification of the detection techniques TDA1 and TDA2 (or at least for one of them), it may furthermore ask the user equipment 1' to stop using these detection techniques. The detection technique TDA3 then takes only the features FEAT as a basis for making its decision with regard to the presence or absence of an attack.

If by contrast the server 9, after executing the detection technique TDA4, determines that the detection techniques TDA1 and TDA2 are reliable, it may send, to the module 2B 1' implementing the third detection technique TDA3 via the exchange module 2F', new rules to be applied for the detection. The purpose of these new rules is to reinforce the learning of the third detection technique TDA3 (this having provided an incorrect decision in contrast to the detection techniques TDA1 and TDA2). Upon receiving these new rules, the update module 2C may re-evaluate the confidence levels assigned to the detection techniques TDA1 and TDA2.

In one variant embodiment, the server 9 may also assign a confidence level to the detection technique TDA3 (by acting in a manner similar or identical to the update module 2C' for the detection techniques TDA1 and TDA2), and update this confidence level upon each request by the user equipment 1'. If the confidence level assigned to the detection technique TDA3 leads the server 9 to suspect that this is suspect or malicious, it may decide to disconnect the user equipment 1' from the network, its behavior being deemed to be abnormal.

When it is condition 3 that triggers the request to the server 9, the module 2B 1' does not execute the detection technique TDA3 for the sake of efficiency. The fourth decision d4 is then used as a substitute for the third decision d3 for the step of updating the confidence levels assigned to the detection techniques TDA1 and TDA2 and, where applicable, for adapting the rules used by these detection techniques.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for monitoring, using a cyber attack detection device, data transiting via a user equipment, the method comprising:

obtaining at least a first decision provided using a first cyber attack detection technique and a second decision provided using a second cyber attack detection technique, the first and second decisions indicating whether the data are associated with cyber attack traffic;

obtaining a third decision provided using a third cyber attack detection technique indicating whether the data are associated with cyber attack traffic, the third detection technique, in order to provide the third decision, using the first and second decisions and information representative of confidence levels assigned to the first and second detection techniques;

updating the confidence levels assigned to the first and second detection techniques on the basis of the obtained first, second and third decisions; and adapting at least one rule applied by the first or the second detection techniques for providing the first and second decisions, the adapting at least one rule being triggered on the basis of the obtained first, second and third decisions and of the updated confidence levels.

2. The method of claim 1, further comprising deactivating use, by the third detection technique, of the decision provided using the first, respectively using the second, detection technique if the confidence level assigned to the first, respectively to the second, detection technique is lower than a given first threshold.

3. The method of claim 2, wherein the first threshold is lower than or equal to 0.2.

4. The method of claim 1, wherein the adapting at least one rule applied by the first, respectively by the second, detection technique is triggered only if the updated confidence level assigned to the first, respectively to the second, detection technique is higher than a given second threshold.

5. The method of claim 1, wherein the confidence level assigned to the first, respectively to the second, detection technique is defined as the ratio between:

a difference between a total number of attacks detected using the first, respectively using the second, detection technique and a total number of false positives and false negatives assigned to the first, respectively to the second, detection technique; and a total number of attacks detected using the third detection technique.

6. The method of claim 1, wherein:

the first detection technique uses predefined attack signatures in order to provide the first decision; and the second detection technique uses at least one model of normal behavior of the data in order to provide the second decision.

7. The method of claim 1, wherein the third detection technique implements reinforcement learning.

8. The method of claim 7, wherein, during the reinforcement learning, input or output parameters of the third detection technique are adjusted so as to maximize a predefined benefit factor.

9. The method of claim 1, wherein the obtainment, updating and, where applicable, adapting are implemented within the user equipment, the method further comprising:

transmitting, to a server of a network to which the user equipment is connected and configured so as to execute a fourth cyber attack detection technique, features representative of the data to which the fourth detection technique is applied;

obtaining a fourth decision provided by the server after applying the fourth detection technique, and indicating whether the data are representative of cyber attack traffic, wherein updating the confidence levels and, where applicable, the adapting are also performed on the basis of the fourth decision.

10. The method of claim 9, wherein the transmitting to the server is triggered:

upon detection of abnormal behavior of the user equipment using the third detection technique;

if the confidence levels assigned to the first and second detection techniques are both lower than a given third threshold; or if a time for the user equipment to obtain the fourth decision provided by the server is less than a time for the user equipment to obtain the third decision by executing the third detection technique itself.

11. The method of claim 10, wherein, when the transmitting to the server is triggered because the time for the user equipment to obtain the fourth decision provided by the server is less than the time for the user equipment to obtain the third decision by executing the third detection technique itself, the user equipment does not execute the third detection technique, and the fourth decision is used for the updating step as a substitute for the third decision.

12. A cyber attack detection device, configured to monitor data transiting via a user equipment, the device comprising a processor and a memory, the device configured to:

obtain at least a first decision provided using a first cyber attack detection technique and a second decision provided using a second cyber attack detection technique, the first and second decision indicating whether the data are associated with cyber attack traffic;

obtain a third decision provided using a third detection technique indicating whether the data are associated with cyber attack traffic, the third detection technique, in order to provide the third decision, using the first and second decisions and information representative of confidence levels assigned to the first and second detection techniques;

update the confidence levels assigned to the first and second detection techniques on the basis of the first, second and third decisions; and adapt at least one rule applied by the first or the second detection techniques for providing the first and second decisions, the adaptation activated on the basis of the first, second and third decisions and of the updated confidence levels.

13. User equipment comprising the detection device of claim 12.

14. A communication system comprising:

a user equipment;

the detection device of claim 12, configured so as to monitor data transiting via the user equipment, and execute a first, a second and a third cyber attack detection technique; and a server of a network to which the user equipment is connected, configured so as to execute a fourth cyber attack detection technique.

15. A non-transitory computer readable medium having stored thereon instructions which, when executed by a processor, cause the processor to implement the method of claim 1.

* * * * *